United States Patent [19]

Paice

[11] 4,438,474

[45] Mar. 20, 1984

[54] CURRENT LIMITER AND VAR GENERATOR UTILIZING A SUPERCONDUCTING COIL

[75] Inventor: Derek A. Paice, Murrysville, Pa.

[73] Assignee: Westinghouse Electric Corp., Pittsburgh, Pa.

[21] Appl. No.: 377,524

[22] Filed: May 12, 1982

[51] Int. Cl.³ ............................................. H02H 9/02
[52] U.S. Cl. ..................................... 361/58; 323/360; 323/363
[58] Field of Search .................... 361/19, 58; 323/205, 323/206, 259, 305, 293, 352, 360, 363, 908

[56] References Cited

U.S. PATENT DOCUMENTS 3,027,466   3/1962   Roalef ............................. 361/58 X Primary Examiner—Harry E. Moose, Jr.

Attorney, Agent, or Firm—D. M. Boles; Benjamin Hudson, Jr.

[57] ABSTRACT

A current control device which may act as a current limiter and/or a VAR generator through the use of a superconducting inductor is taught. In one of the embodiments of the present invention, a full wave bridge rectifier network is serially inserted in one leg of a high voltage transmission system. The output of the full wave bridge network has connected between it a superconducting coil in series with a bias supply. The biasing supply circulates current in the inductor. Should the line current exceed the value of the current circulating in the inductor, the inductor impedes the increase of current giving sufficient time for current interruption devices, should they be utilized, to operate. Additionally, the biasing supply may act as a VAR generator by controlling the current in the superconductor or in the power supply feeding it.

21 Claims, 2 Drawing Figures

CURRENT LIMITER AND VAR GENERATOR UTILIZING A SUPERCONDUCTING COIL

BACKGROUND OF THE INVENTION

This invention relates, generally, to a high power current control device and more particularly to current limiting as well as static VAR generation by utilizing a superconducting coil.

Power distribution systems have always required the use of current limiting and current interrupting devices within the system so that short circuit fault conditions can be isolated. For this problem current interruption devices such as circuit breakers are generally utilized. However, devices such as circuit breakers are relatively slow in operation in that for AC systems several cycles of fault current are generally present before the circuit breaker trips out. Current limiting devices are particularly useful where it is necessary to limit short circuit current for at least a few cycles in an alternating current system or for a predetermined period of time in direct current systems so as to limit the stresses associated with high short circuit currents and enable circuit breakers to perform their functions. Many current limiting methods utilize series chokes or coils as an impedance to limit the rate of rise of fault current. However, in high power distribution systems the insertion of a conventional choke or coil would cause unacceptable power losses due to the resistance introduced by the windings of a choke or coil. With the introduction of superconductors a number of newer systems have utilized superconductive coil elements since the resistive losses associated with superconductors are orders of magnitudes lower than those in standard chokes or coils. Such types of devices may be found in U.S. Pat. No. 4,117,524, "Current-Limiting Devices", issued Sept. 26, 1978 to Parton et al.; U.S. Pat. No. 4,045,823, "Current Limiting Devices for Alternating Current Systems", issued Aug. 30, 1977 to Parton; U.S. Pat. No. 3,925,707, "High Voltage Current Limiting Circuit Breaker Utilizing a Superconductive Resistive Element", issued Dec. 9, 1975 to Bhate et al.; and U.S. Pat. No. 3,703,664, "Fault Current Limiter Using Superconductive Element", issued Nov. 21, 1972 to Cronin.

However, the above-mentioned patents either require that the superconductor be part of a saturable reactor core biasing scheme and, therefore require additional components such as reactor cores, or that they lose their superconductivity during excess current conditions or initiation of a switching operation to insert resistive elements. Moreover, the above-mentioned patents do not provide means for or envisage power factor control on a relatively rapidly changing basis to accommodate different load conditions.

It is desirable to have a device which utilizes a superconducting coil to limit fault current without requiring that the superconductor be driven out of saturation into a normal condition or require the superconductor to switch other resistive components into the circuit. It is also desirable to have a device which may exercise VAR generator control in conjunction with a superconductor. Such a scheme is taught in the present invention.

Briefly stated, a current control device is used for limiting and controlling current in an electrical transmission system. An electrical power source is used with a plurality of unidirectional devices connected with at least one superconducting impedance device so that current produced by a current generator is caused to flow in the superconductor in one direction only. A current generating device is connected to the superconducting impedance device for circulating a current in the superconducting impedance device. The unidirectional voltage device and the superconducting impedance device is connected with the power source so that the portion of current introduced by the power source which exceeds the value of the current produced by a current generator is impeded by inductance in the superconducting device.

BRIEF DESCRIPTION OF THE DRAWINGS

Reference is now made to the description of the preferred embodiment, illustrated in the accompanying drawings, in which.

DESCRIPTION OF THE PREFERRED EMBODIMENTS

Figure 1:
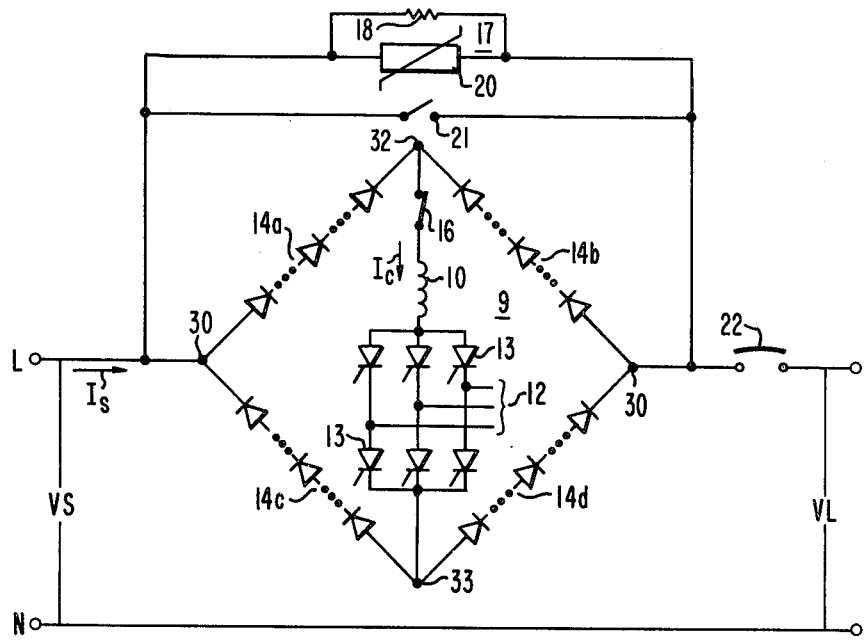
FIG. 1 is a schematic diagram of the current limiter and VAR generator of the present invention.

Referring now to the drawings and in particular to FIG. 1, a schematic diagram of one of the preferred embodiments of the present invention is shown. Shown here is part of a high voltage transmission system and in the preferred embodiment of the present invention is one phase of a three-phase alternating current system. A voltage source $V_S$ is shown as measured between the line side L and the neutral leg N and would be supplied power from an upstream power source such as a substation, distribution network or power generation plant. The voltage source $V_S$ supplies power to a load $V_L$ which is downstream of the current control device 9. Serially inserted in the line said L is a full wave bridge diode network comprised of diode strings 14a, 14b, 14c and 14d. The full wave bridge circuit comprised of the diode string 14a–d is serially inserted in the line side L of the transmission system at the full wave bridge input terminals 30. Connected to the full wave bridge output terminals 32 is a superconductor cutout switch 16, a superconducting coil 10 and a bias supply shown generally at 12 which utilizes bias supply thyristors 13. Also connected to the full wave bridge input terminals 30 is a bypass switch 21. Connected in parallel with the bypass switch 21 is a transient control network 17 which is comprised of a current limiting resistor 18 and a non-linear resistor 20. Also serially inserted in the load side is a circuit breaker 22. Under normal operating conditions the coil current $I_C$, which is introduced and maintained by the bias supply 12, is sized so as to exceed the line current $I_S$. The value of the line current $I_S$ is the design value for the load (not shown) and may be, for example, the steady state current or the maximum permissible current in the system. Since all the diodes of the diode string 14a–d conduct current, the voltage drop across the current control device 9 is essentially zero with the result that the AC circuit current $I_S$ flows unimpeded. It is obvious to those skilled in the art that the value of the current circulating in the superconductor 10 by the bias supply 12 limits the value of the line current $I_S$. Therefore if the line current $I_S$ tries to exceed the value of the circulating current $I_C$, the inductor 10 will immediately act to limit the rate of increase of current. By making the inductance of the superconducting coil 10 much greater than the AC system's source inductance (not shown) a very slow increase of fault current can be obtained. It is also obvious to one skilled in the art, however, that once a fault current does exist, the superconducting coil 10 cannot limit the current indefinitely. Therefore, the circuit breaker 22 would be opened to limit the current within a reasonable time and in a preferred embodiment of the present invention would be after one or two cycles of fault current. This would therefore provide sufficient time for the circuit breaker 22 to detect and interrupt the current flow. The superconductor cutout switch 16 is provided to permit protection of the coil 10 and its cooling system (not shown) for possible failures which may occur during operating conditions. A bypass switch 21 is provided to completely bypass the current control device 9 should such an occurrence be necessary. A non-linear resistor 20 is utilized to limit the instantaneous peak voltage developed across the diode string 14 under fault conditions with the current limiting resistor 18 used to permit higher fault currents to flow should this contingency be necessary.

Each leg of the diode string 14a, 14b, 14c and 14d is comprised, in the preferred embodiment of the present invention, of a series connection of diodes so as to accommodate high voltage stress which may occur during a fault condition. The bias supply 12 inserts a voltage which is low with respect to the supply or load voltage $V_S$ and $V_L$, respectively, into the superconducting coil 10. The current inserted by the bias supply 12 is related to the desired value of source current such that the current in, for example, diode string 14a would be $(I_C+I_S)/2$ while the current in diode string 14c would be $(I_C-I_S)/2$. The bias supply thyristors 13, in the preferred embodiment of the present invention, are part of a three-phase thyristor converter (not shown).

Further, the bias supply 12 may be operated from an appropriate transformer source so as to perform as a superconducting VAR generator as described in "Application of Superconducting Coils to VAR Control in Electric Power Systems: A Proposal" by H. J. Boening and W. V. Hassenzahl in Los Alamos Scientific Laboratory Proposal No. LA-8055-P and which is incorporated by reference herein. To one skilled in the art it is relatively easy to utilize the bias supply 12 in conjunction with the current control device 9 to provide VAR generator control as well as current limiting.

Figure 2:
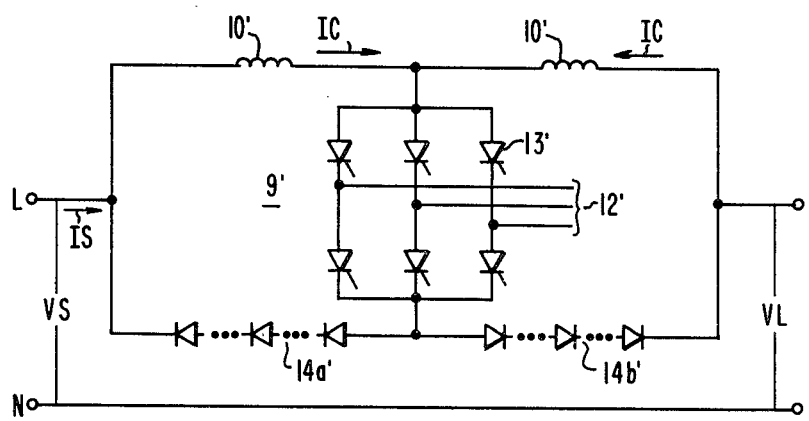
FIG. 2 is an alternate embodiment of the present invention also in schematic diagram form.

Referring now to FIG. 2, an alternate embodiment of the present invention is shown. Again the current control device 9' is serially inserted in the line side L of the transmission system. However this time, two superconducting coils 10' and two sets of diode strings 14a' and 14b' are utilized. The bias supply 12' is also utilized to circulate current in the current control device. Similarly, as in FIG. 1 VAR generator control may also be utilized.

It is to be understood that many embodiments of the present invention are possible without departing from the spirit and scope of the present invention. For example, the transmission system of the present invention may be a poly-phase system, a single-phase system or part of a DC transmission network. Further, the number of diodes in the diode string may be varied so as to accommodate different voltages in transmission systems and could encompass the use of a single diode for each leg of the network. Additionally, different biasing supplies or methods for inserting and trapping current in the superconductors may also be utilized. Additionally, the number of bypass, cutout or other types of switches may be varied depending upon individual circumstances. Further, the number of circuit breakers may be varied as well as the positioning of the circuit breaker or the switches. Additionally, the protective devices of FIG. 1 may be added to FIG. 2 or the control transient network may be modified or eliminated as circumstances warrant.

Therefore, in addition to the above-enumerated advantages the disclosed invention produces a relatively inexpensive, easy to manufacture current control system. Additionally the present invention is automatic, providing instantaneous operation at values of overcurrent only slightly greater than normal loads, while not requiring any sensing or control means, thereby further reducing system complexity as well as providing significantly reliable performance.

What I claim is:
1. A current limiting device, comprising:
   a plurality of unidirectional voltage means interconnected so as to have an input connected to an electrical power source for producing a constant polarity voltage at output terminals thereat;
   current generating means for producing a current in a superconducting impedance means; and
   superconducting impedance means connected in series circuit relationship with said current generating means, said series circuit being connected to said output terminals, thereby slowing down the rate of current rise produced by said electrical power source.
2. A device according to claim 1 wherein said superconducting impedance means is comprised of a superconductor coil.
3. A device according to claim 1 wherein said unidirectional voltage means are comprised of diodes.
4. A device according to claim 1 wherein said plurality of unidirectional voltage means are interconnected so as to form a full wave bridge rectifier network.
5. A device according to claim 1 wherein said current produced by said current generating means is a unidirectional current.
6. A plurality of current limiting devices according to claim 1 wherein said electrical power source is a poly-phase alternating current power system, wherein each of said plurality of current limiting devices is interconnected with a phase of said poly-phase alternating current system.
7. A plurality of current limiting devices according to claim 6 wherein said poly-phase alternating current system is a three-phase system.
8. A device according to claim 1 wherein said current generating means is comprised of a thyristor converter means and a control circuit means interconnected with each other so as to vary the amount and duration of said current passing through said superconducting impedance means.
9. A device according to claim 4 wherein each leg of said full wave bridge rectifier network contains a plurality of diodes.
10. A current limiting device, comprising:
    a first superconducting impedance means connected in a first series circuit relationship with a second superconducting impedance means, said first series circuit being connected in series circuit relationship with an electrical power source;
    first unidirectional voltage means connected in second series circuit relationship with a second unidirectional voltage means, said second unidirectional voltage means connected so as to allow current to flow in a direction reverse of that of said first unidirectional voltage means, said second series circuit relationship being connected in parallel with said first series circuit; and current generating means connected between the junction of said first and said second superconducting impedance means and the junction of said first and said second unidirectional voltage means, said current generating means introducing current in said first and said second superconducting impedance means and thereby slowing down the rate of current rise produced by said electrical power source.

11. A device according to claim 10 wherein said first and said second superconducting impedance means are comprised of superconducting coils.

12. A device according to claim 10 wherein said first and said second unidirectional voltage means are comprised of diodes.

13. A device according to claim 10 wherein said first and said second unidirectional voltage means are each comprised of a plurality of diodes.

14. A plurality of current limiting devices according to claim 10 wherein said electrical power source is a poly-phase alternating current system and each of said plurality of current limiting devices is interconnected with a phase of said poly-phase alternating current system.

15. A device according to claim 14 wherein said poly-phase alternating current system is a three-phase alternating current system.

16. A plurality of current limiting devices according to claim 10 wherein said first and said second superconducting impedance means are arranged so as to obtain mutual electrical coupling between said first and said second superconducting impedance means.

17. A current limiting device, comprising:

a plurality of unidirectional voltage means connected with at least one superconducting impedance means so that current produced by a current generator is caused to flow in said superconducting means in one direction only, said unidirectional voltage means and said superconducting impedance means is connected with an electrical power source thereby slowing down the rate of current rise produced by said electrical power source; and current generating means connected to said superconducting impedance means for circulating a current in said superconducting impedance means.

18. A device according to claim 17 wherein said unidirectional voltage means are comprised of diodes.

19. A device according to claim 17 wherein said superconducting impedance means is comprised of a superconducting coil.

20. A plurality of current limiting devices according to claim 17 wherein said electrical power source is a poly-phase alternating current system and each of said plurality of current limiting devices is interconnected with a phase of said poly-phase alternating current system.

21. A plurality of current limiting devices according to claim 20 wherein said poly-phase alternating current system is a three-phase alternating current system.

* * * * *